(12) United States Patent
Clark (10) Patent No.: US 11,779,011 B2
(45) Date of Patent: Oct. 10, 2023

(54) MIGRATORY BIRD DECOY AND MIGRATORY BIRD DECOY WING ASSEMBLY

(71) Applicant: MW Clark Enterprises, LLC, Denver, CO (US)

(72) Inventor: Michael W. Clark, Denver, CO (US)

(73) Assignee: MW Clark Enterprises, LLC, Denver, CO (US)

( * ) Notice: Subject to any disclaimer, the term of this patent is extended or adjusted under 35 U.S.C. 154(b) by 290 days.

(21) Appl. No.: 16/849,724

(22) Filed: Apr. 15, 2020

(65) Prior Publication Data

US 2020/0329695 A1 Oct. 22, 2020

Related U.S. Application Data

(60) Provisional application No. 62/835,638, filed on Apr. 18, 2019.

(51) Int. Cl.
*A01M 31/06* (2006.01)
*F16B 2/08* (2006.01)

(52) U.S. Cl.
CPC ................... *A01M 31/06* (2013.01)

(58) Field of Classification Search
CPC ........ A01M 31/06; G09F 17/00; E04H 12/32; B63C 11/26
USPC ............................................................. 43/3
See application file for complete search history.

(56) References Cited

U.S. PATENT DOCUMENTS

| | | | | |
|---|---|---|---|---|
| 1,653,083 A | * | 12/1927 | Blaw ....................... | E04H 12/32 248/541 |
| 2,747,316 A | * | 5/1956 | Benedetto ............. | A01M 31/06 43/3 |
| 3,736,688 A | * | 6/1973 | Caccamo ............... | A01M 31/06 43/3 |
| 3,872,529 A | * | 3/1975 | Wainwright ............ | B63C 11/26 116/202 |
| 3,920,207 A | * | 11/1975 | Adamaitis ............... | A01K 97/10 224/907 |
| 4,620,385 A | * | 11/1986 | Carranza ............... | A01M 31/06 446/236 |
| 5,098,051 A | * | 3/1992 | Aldridge ................... | G09F 7/18 248/219.4 |
| 5,191,730 A | | 3/1993 | Balmer | |
| 5,247,900 A | * | 9/1993 | Sobczak ................. | G09F 17/00 116/211 |
| 5,899,167 A | * | 5/1999 | Furman ............... | F16C 11/0619 403/115 |

(Continued)

*Primary Examiner* — Peter M Poon
*Assistant Examiner* — Hae Rie Jessica Byun
(74) *Attorney, Agent, or Firm* — Cochran Freund & Young LLC; William P. O'Meara (57) ABSTRACT

A migratory bird decoy wing assembly for use with a migratory bird decoy includes an elongate shaft extending in a straight line between a first end and an opposite second end and a first flexible flag. The first flexible flag is adapted to be flappingly displaceable relative the elongate shaft. The migratory bird decoy wing assembly also includes an elongate shaft mounting device constructed to removably mount the elongate shaft on a body of the migratory bird decoy so that the elongate shaft extends perpendicular to the surface of the migratory bird decoy body and flapping movement of the first flexible flag produced by wind simulates the movement of a bird flapping its wing.

5 Claims, 7 Drawing Sheets

(56) References Cited

U.S. PATENT DOCUMENTS

| | | | | |
|---|---|---|---|---|
| 6,293,042 B1 * | 9/2001 | Arvanitis, Jr. | ........ | A01M 31/06 43/3 |
| 7,131,230 B1 * | 11/2006 | Gilsdorf | ................ | A01M 31/06 43/2 |
| 7,823,320 B1 * | 11/2010 | Nelson | .................. | A01M 31/06 446/217 |
| 8,510,916 B2 * | 8/2013 | Kinvi | ...................... | E04H 12/32 248/541 |
| 2008/0045100 A1 * | 2/2008 | Dungan | .................... | B63C 9/20 441/89 |
| 2012/0174852 A1 * | 7/2012 | Greenstone | ............. | G09F 21/02 116/173 |
| 2015/0194081 A1 * | 7/2015 | Peters | ................... | A01M 31/06 446/236 |
| 2017/0367321 A1 * | 12/2017 | Weber, Jr. | ............. | A01M 31/06 |

* cited by examiner

MIGRATORY BIRD DECOY AND MIGRATORY BIRD DECOY WING ASSEMBLY

This application claims priority from U.S. Provisional Patent Application Ser. No. 62/835,638 filed Apr. 18, 2019 for BIRD DECOY AND BIRD DECOY WING ASSEMBLY of Michael W. Clark, which is hereby incorporated by reference for all that it discloses.

BACKGROUND

Man has long hunted migratory birds for food, plumage and sport. An estimated 2,000 years ago, Indians began making static decoys from reeds, sticks and grass. Later, wooden decoys were created by carving and painting. The use of decoys caused migratory bird hunting methods to change from stalking birds to luring birds to a hunter's fixed position. The use of decoys is the most prevalent migratory bird hunting technique today, with most hunters using at least a dozen decoys and many hunters using several dozen. The basic strategy is to capture the attention of migratory birds, which are flying hundreds of feet in the air, by displaying many static decoys in the water below. The decoys lure the birds closer because of a flock instinct for safety in numbers.

The modern-era duck call was invented in the 1860's. By use of a duck call, sound is combined with the visual effect of static decoys to further capture the attention of migratory birds in flight.

In 1998, the first electronic battery-operated moving decoy was introduced to the sport of hunting. This tactic of incorporating motion and sound with static visual decoys was widely adopted and proved to be very effective. The early motion models were decoys with spinning or flapping wings driven by an internal battery. Since then a variety of battery-operated decoys have come on the market. Battery operated decoys have been used to simulate diving birds feeding under the surface of the water and to simulate swimming, wiggling and wobbling birds.

SUMMARY

A migratory bird decoy wing assembly for use with a migratory bird decoy includes an elongate shaft having a first end and an opposite second end and a first flexible flag having a first edge portion and a second edge portion disposed opposite the first edge portion. The first flexible flag is adapted to be mounted on the elongate shaft with the first edge portion of the flag proximal the elongate shaft and with the second edge portion of the flag distal the elongate shaft and flappingly displaceable relative the elongate shaft. The migratory bird decoy wing assembly also includes an elongate shaft mounting device constructed and arranged to removably and nondestructively mount the elongate shaft on a body of the migratory bird decoy so that the elongate shaft extends transversely to the surface of the migratory bird decoy body and so that, in a normal mounted operating state of the migratory bird decoy wing assembly, the first flexible flag is spaced apart from the surface of the migratory bird decoy body so that flapping movement of the first flexible flag produced by wind simulates the movement of a bird flapping its wing.

A migratory bird decoy includes a migratory bird decoy body having an exterior surface and a wing assembly. The wing assembly includes an elongate shaft having a first end and an opposite second end and a first flexible flag having a first edge portion and a second edge portion disposed opposite the first edge portion. The first flexible flag is adapted to be mounted on the elongate shaft with the first edge portion of the flag proximal the elongate shaft and with the second edge portion of the flag distal the elongate shaft. The flag is flappingly displaceable relative the elongate shaft by wind. A wing assembly attachment assembly is constructed and arranged to removably mount the wing assembly on a migratory bird decoy body with the elongate shaft extending transversely to the exterior surface of the migratory bird decoy body and upwardly. The flexible flag is positioned above and spaced apart from the surface of the migratory bird decoy body. Flapping movement of the flexible flag produced by wind simulates the movement of a bird flapping its wing.

A method of making a migratory bird decoy assembly that produces movement simulating flapping bird wings, without use of an attached power source, includes mounting on a shaft a flag that flaps in response to wind; mounting a first end of the shaft on a strap; and attaching the strap around a migratory bird decoy body. These actions may be performed in any sequence.

DETAILED DESCRIPTION

The migratory bird decoy wing assembly described herein is a simple, easy to transport, environmentally friendly, accessory to a hunter's static decoys. In one embodiment, the wing assembly includes at least one wing that may be attached to a decoy with an adjustable strap.

A migratory bird decoy with a migratory bird decoy wing assembly of the type disclosed herein will appeal to the "purist" and "environmentalist hunter," who are not comfortable using a motion decoy containing a lithium battery. It will also appeal to the hunter who already has an assortment of bulky, heavy gear to pack in and out of the field, often under inclement weather conditions well before the break of dawn or after sunset. In one embodiment, a migratory bird decoy wing assembly is provided as a kit that is used to convert a hunter's static decoys into more effective, wind actuated decoys. The kit is lightweight and compact and is easily transported and mounted on static decoys in the field. The migratory bird decoy wing assembly, actuated by wind, simulates a bird flapping its wing(s).

Figure 1:
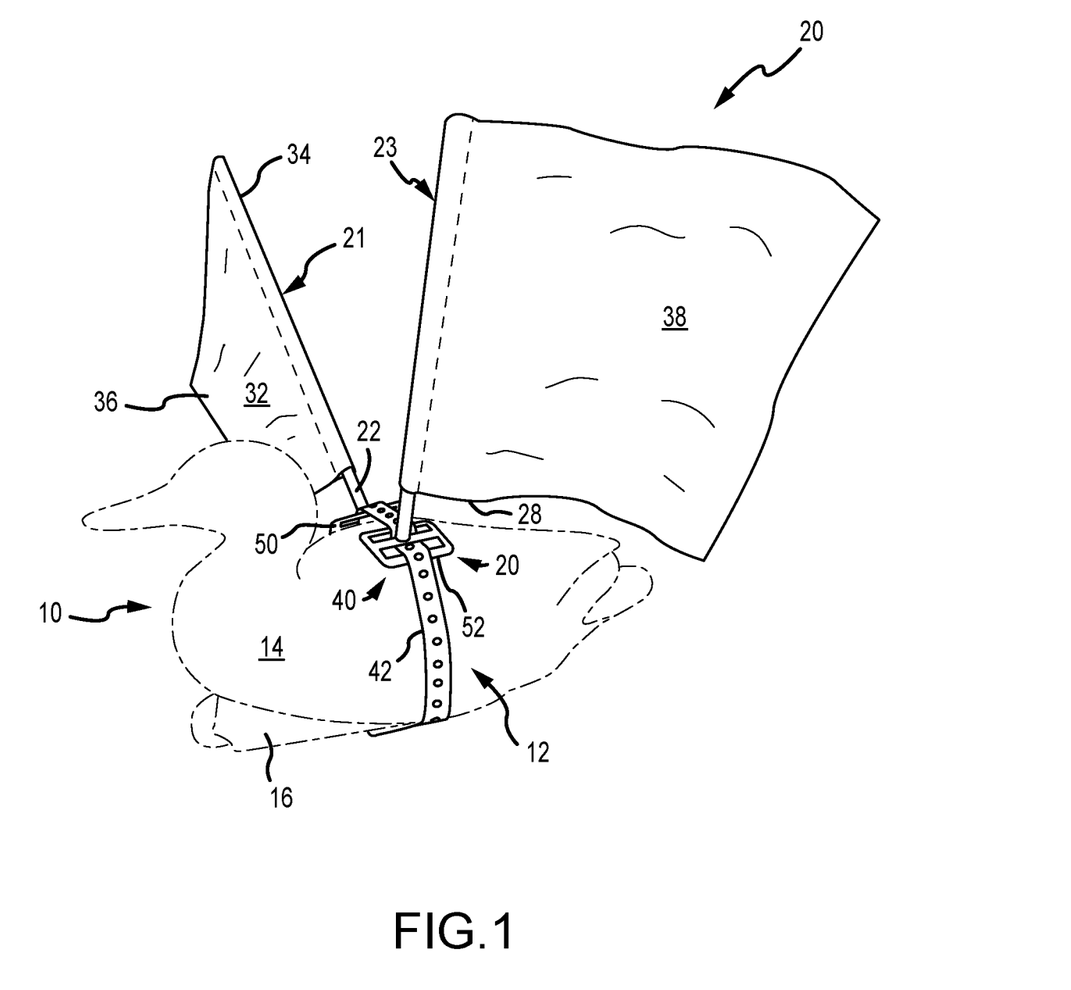
FIG. 1 is a left side isometric view of a migratory bird decoy with a wing assembly removably mounted thereon.
Figure 2:
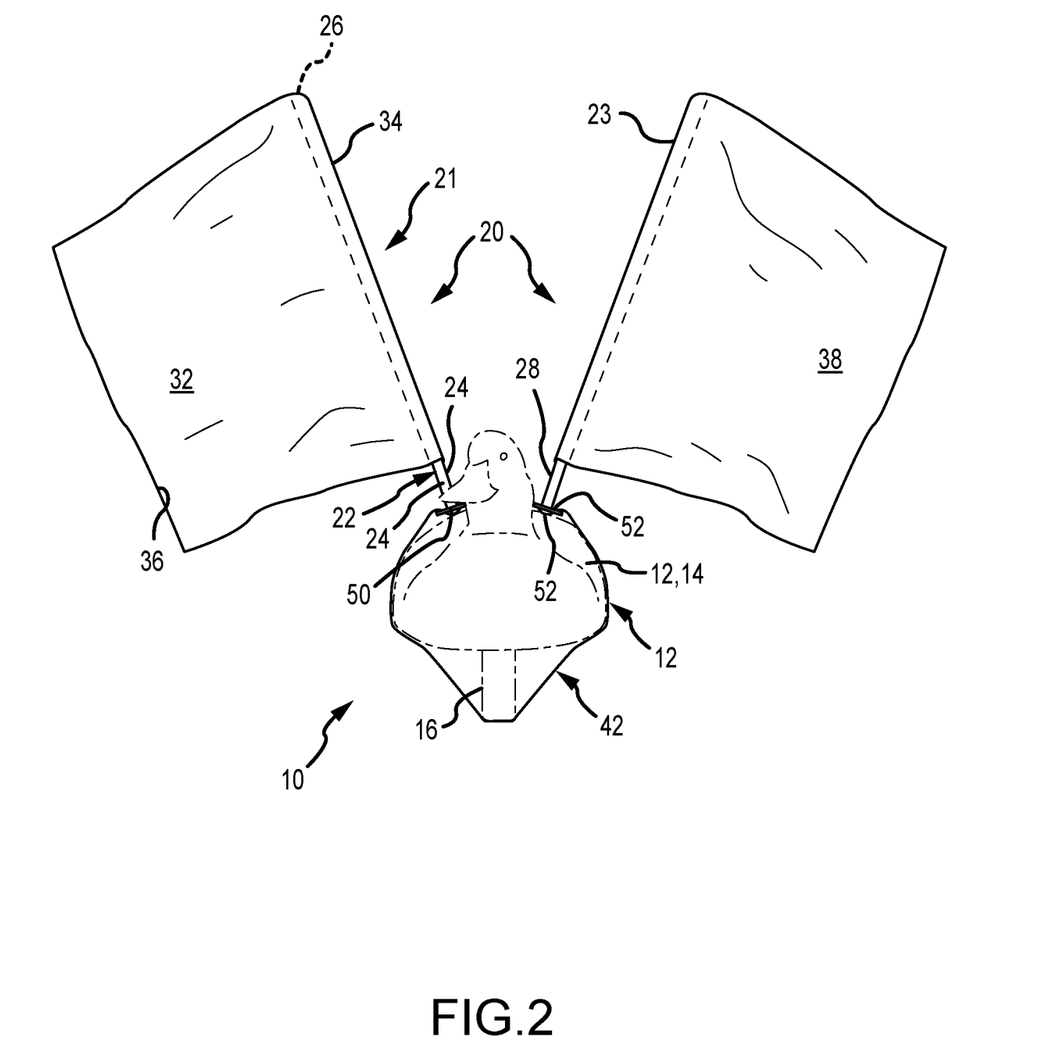
FIG. 2 is a frontal isometric view of the migratory bird decoy and wing assembly of FIG. 1.
Figure 3:
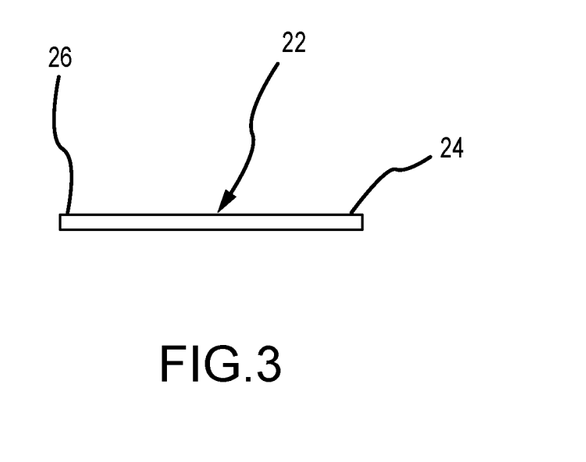
FIG. 3 is a side elevation view of an elongate shaft used in the wing assembly of FIG. 1.
Figure 6:
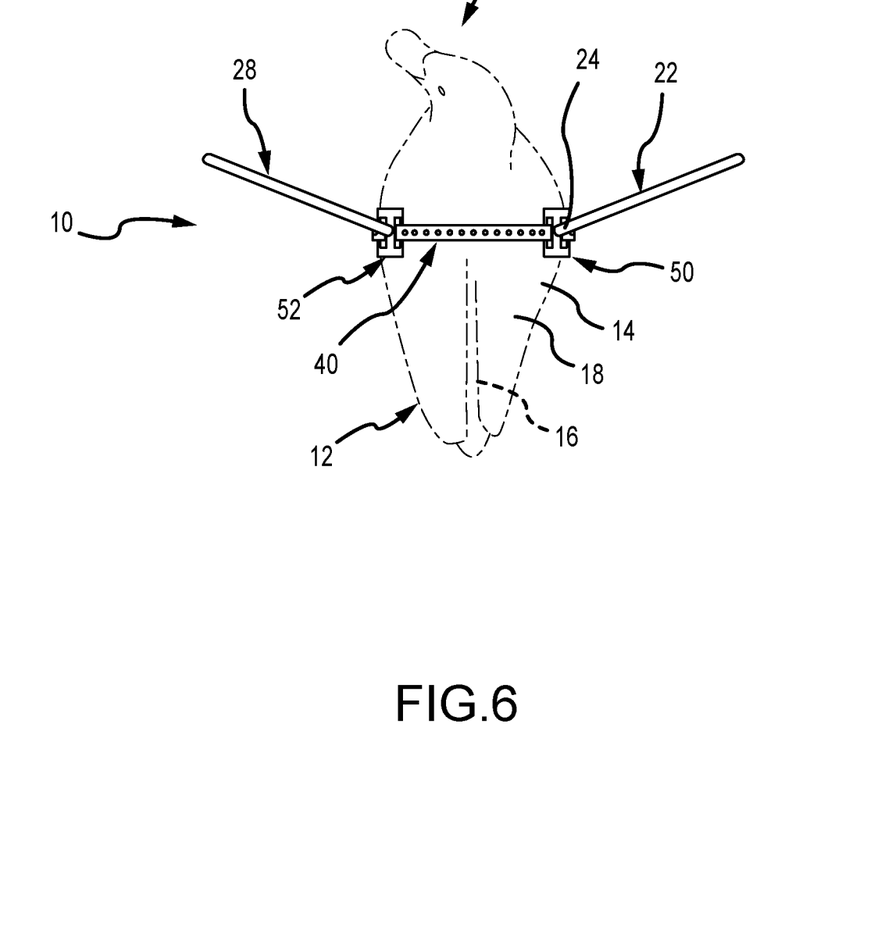
FIG. 6 is a top isometric view of the migratory bird decoy with a portion of the wing assembly of FIG. 1 removably attached thereto.
Figure 7:
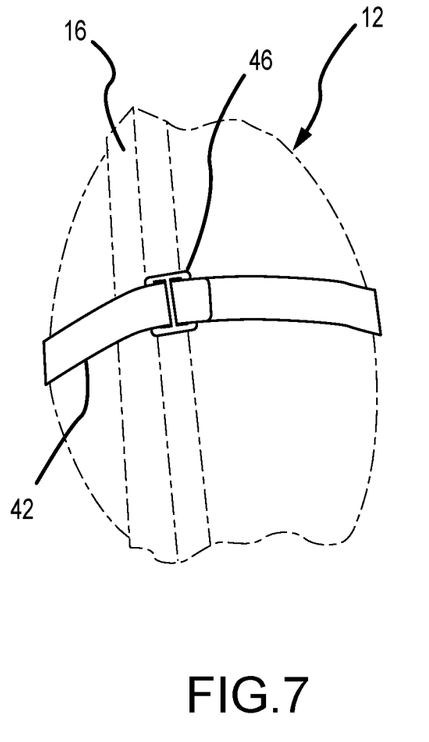
FIG. 7 is a bottom isometric view of a weighted keel decoy with the strap of FIG. 4 removably attached thereto.

FIGS. 1 and 2 are left side and frontal isometric views of a migratory bird decoy 10 with a wing assembly 20 removably mounted thereon. FIG. 6 is a top isometric view of the migratory bird decoy 10 and mounted wing assembly 20 of FIGS. 1 and 2. FIG. 3 is a side elevation view of an elongate shaft used in the wing assembly 20 of FIGS. 1 and 2. As best shown by FIGS. 1, 2 and 6, the migratory bird decoy body 12 has an outer surface 14 and a decoy weighted bottom keel 16. The wing assembly 20, which may comprise one wing 21 or, as shown, two wings 21, 23, is removably mounted on the decoy body 12. The wing assembly first wing 21 comprises a first elongate shaft 22, FIGS. 1-3, having a first end 24 and an opposite second end 26. The wing assembly 20 also includes a first flexible flag 32, FIGS. 1 and 2, having a first edge portion 34 and a second edge portion 36 disposed opposite the first edge portion 34. The first flexible flag 32 is adapted to be mounted on the elongate shaft 22 with the first edge portion 34 of the flag 32 located proximal the elongate shaft 22 and with the second edge portion of the flag 34 located distal the elongate shaft 22. In the illustrated embodiment, the first edge portion is formed into a sleeve. This sleeve allows the first flexible flag 32 to be mounted on the elongate shaft 22 by sliding the first end 24 of the shaft 22 into the sleeve formed by the first edge portion 34. Various other methods of mounting the first flexible flag 32 on the elongate shaft 22 so that the first flexible flag 32 may flap in response to wind may also be employed.

A wing assembly attachment assembly 40 is constructed and arranged to removably and nondestructively mount the wing assembly 20 on the migratory bird decoy body 12 with the elongate shaft 22 extending transversely to, in one embodiment perpendicular to, the outer surface 14 of the migratory bird decoy body 12. The flexible flag 32 is spaced apart from the surface 14 of the migratory bird decoy body 12, and also the surface of any water (not shown) or any other support surface such as soil or brush (not shown), in/on which the decoy 10 may be supported. Wind will cause flapping movement of the flexible flag that simulates the movement of a bird flapping its wing. In another embodiment (not shown), a small portion of the flag 32 may touch the decoy body 12 or the water or other surface on which the decoy 12 is supported. The flexible flag 32 may be constructed of a lightweight material that does not readily absorb water and that will be displaced by even a slight breeze, for example, light weight plastic, nylon, or metal foil.

Figure 4:
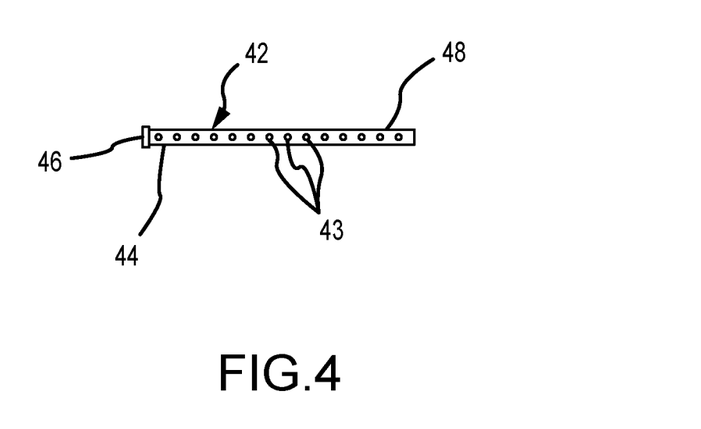
FIG. 4 is a top plan view of a strap with an end buckle used to mount the wing assembly on a decoy.
Figure 5:
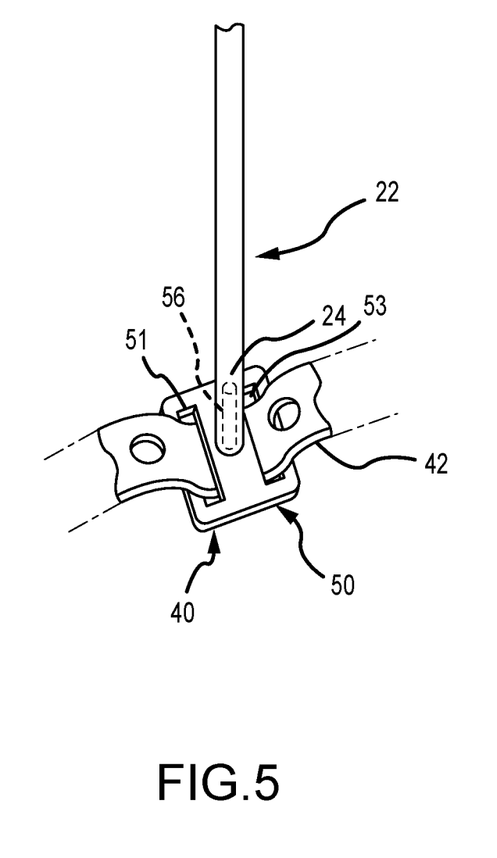
FIG. 5 is an isometric view of a shaft and shaft mounting buckle attached to the strap illustrated in FIG. 4.

FIG. 4 is a top plan view of a flexible strap 42 that forms a portion of the wing attachment assembly 40. The strap 42 has a first end 44 having an end buckle 46 mounted thereon and an opposite second end 48 and has a plurality of spaced apart holes 43 that co-act with end buckle 46 to secure the strap 42 around the decoy body 12. As shown by FIG. 5, a shaft 22 engagement buckle 50 has two slots 51, 53 through which strap 42 is threaded, so that buckle 50 is slidingly displaceably mounted on the strap 42. The shaft engagement buckle 50 is selectively stably positionable at a desired location on the migratory bird decoy body 12 upper surface portion 18, by sliding the buckle 50 to a desired position on the strap 42 and then tightening the strap 42 around the decoy body 12, as shown in FIGS. 1, 2, 6 and 7.

In one embodiment, the elongate shaft 22 is tubular, and the shaft engagement buckle 50 comprises a buckle horn/stud 56, FIG. 5, that may be closely frictionally received within the tubular elongate shaft 22 to quickly removably mount the elongate shaft 22 on the buckle 50. The buckle 50 may be constructed and arranged to lie parallel to the outer surface portion 14 of the decoy body 12 where it is engaged by the strap 42 and buckle 50. The horn/stud 56 may extend perpendicular to the central longitudinal plane of the buckle 50 such that, when the elongate shaft 22 is mounted on the buckle 50, the shaft 22 extends substantially perpendicular to the central plane of the buckle 50 and thus perpendicular to the exterior surface 14 of the decoy body 12 where surface 14 thereof is engaged by the buckle 50. Thus, in this embodiment, when the strap 42 is fastened, the wing assembly elongate shaft 22 extends generally perpendicular to the next adjacent exterior surface portion of the migratory bird decoy body 12.

The migratory bird decoy wing assembly 20 may further include a second wing that may be essentially identical to the first wing described above. The second wing may include a second elongate shaft 28 and a second flexible flag 38 mounted by a second buckle 52 of the wing assembly attachment assembly 40. Thus, in this embodiment the wing assembly 20 comprises two wings 21, 23 that simulate the flapping of bird wings when air moves over the flags 32, 38.

Figure 8:
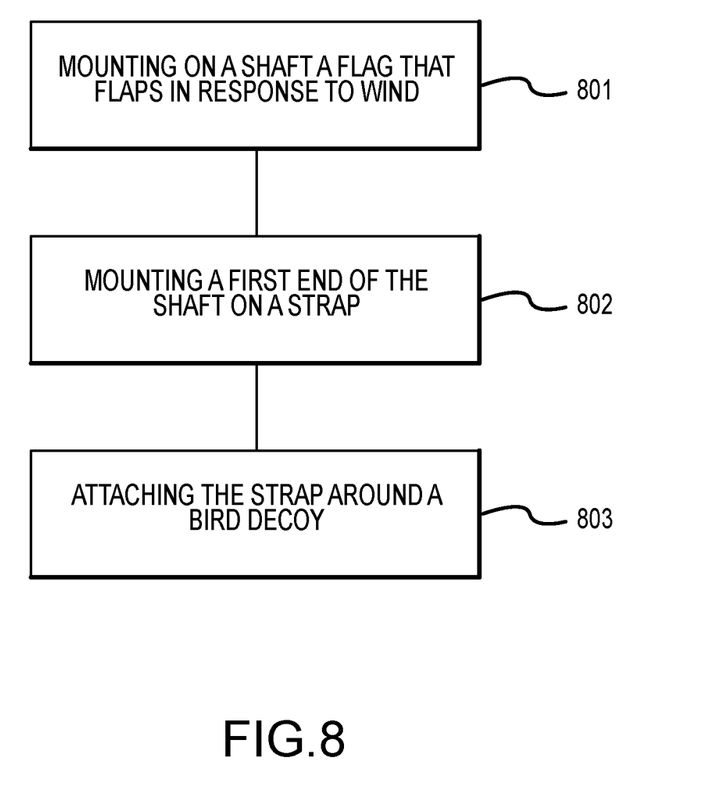
FIG. 8 is a block diagram of a method of making a wind actuated migratory bird decoy.

FIG. 8 is a block diagram of a method of making a wind actuated migratory bird decoy. The method includes, as illustrated at 801, mounting on a shaft a flag that flaps in response to wind. The method further includes, as illustrated at 802 mounting a first end of the shaft on a strap and, as illustrated at 803, attaching the strap around a migratory bird decoy. The actions 801, 802, 803 may be performed in any sequence.

Although the embodiment of a migratory bird decoy described and illustrated herein is a duck decoy, the decoy may be any migratory bird decoy. The migratory bird decoy wing assembly in some embodiments has a wing color pattern simulating the wing color pattern of a migratory bird species. The migratory bird species wing color pattern may be that of any migratory bird species including, but not limited to: doves, such as mourning doves, Eurasian collared-doves, ground doves and other doves; ducks, such as mallards, canvasbacks, redheads, pintails, gadwalls, ruddy ducks, harlequins, hooded and red-breasted mergansers, black ducks, wood ducks, blue wing teals, green wing teals, buffleheads, shovelers, widgeons, goldeneyes, ocean ducks, including oldsquaws (long tailed ducks) and scoters Pacific black ducks, Australian wood ducks, chestnut teals, grey teals, pink-eared ducks and mountain ducks; geese, such as Canada geese and snow geese; and swans.

Embodiments of a migratory bird decoy wing assembly, a migratory bird decoy with a migratory bird decoy wing assembly mounted thereon and related methodologies for making and using the same are described in detail herein. Alternative embodiments will occur to those skilled in the art after reading this disclosure. It is intended that the language of the appended claims be construed broadly to cover all such alternative embodiments, except to the extent limited by the prior art.

What is claimed is:

1. A migratory bird decoy wing assembly for mounting on a migratory bird decoy, the migratory bird decoy wing assembly comprising first and second tubular elongate shafts, each shaft extending in a straight line between a first terminal end thereof and an opposite second terminal end thereof;

a first flexible flag having a first edge portion and a second edge portion disposed opposite the first edge portion, wherein the first flexible flag is adapted to be mounted on the first elongate shaft with the first edge portion of the flag proximal the first elongate shaft and with the second edge portion of the flag distal the first elongate shaft and flappingly displaceable relative the first elongate shaft;

a second flexible flag having a first edge portion and a second edge portion disposed opposite the first edge portion, wherein the second flexible flag is adapted to be mounted on the second elongate shaft with the first edge portion of the flag proximal the second elongate shaft and with the second edge portion of the flag distal the second elongate shaft and flappingly displaceable relative the second elongate shaft;

a first elongate shaft mounting device constructed and arranged to removably and nondestructively mount a linear end portion of the first terminal end of the first elongate shaft on a body of the migratory bird decoy so that the linear end portion, as well as the remainder of the first elongate shaft, extends perpendicular to the surface of the migratory bird decoy body and so that in a normal mounted operating state of the migratory bird decoy wing assembly the first flexible flag is spaced apart from the surface of the migratory bird decoy body and a surface which supports the migratory bird decoy, so that flapping movement of the first flexible flag produced by wind simulates the movement of a bird flapping a first wing; and a second elongate shaft mounting device constructed and arranged to removably and nondestructively mount a linear end portion of the first terminal end of the second elongate shaft on the body of the migratory bird decoy so that the linear end portion, as well as the remainder of the second elongate shaft, extends perpendicular to the surface of the migratory bird decoy body and so that in a normal mounted operating state of the migratory bird decoy wing assembly the second flexible flag is spaced apart from the surface of the migratory bird decoy body and a surface which supports the migratory bird decoy, so that flapping movement of the second flexible flag produced by wind simulates the movement of a bird flapping a second wing, wherein said second elongate shaft mounting device is separate from and selectively positionable relative to said first elongate shaft mounting device.

2. The migratory bird decoy wing assembly of claim 1, wherein the first elongate shaft mounting device comprises a first elongate shaft engagement buckle and a flexible belt having a plurality of spaced apart holes therein and a belt end buckle co-acting with the spaced apart holes for securing the belt around the decoy body.

3. The migratory bird decoy wing assembly of claim 2, wherein the second elongate shaft mounting device comprises a second elongate shaft engagement buckle and the flexible belt, and wherein the belt is adapted to be quickly releasably strapped around the migratory bird decoy body and wherein the first and second shaft engagement-buckles are slidingly displaceable on the belt so the first and second buckles are each selectively positionable relative to the migratory bird decoy body and relative to the other buckle.

4. The migratory bird decoy wing assembly of claim 2, wherein the first elongate shaft is a tubular elongate shaft and wherein the first elongate shaft engagement buckle comprises a buckle horn receivable within the first tubular elongate shaft.

5. A migratory bird decoy comprising:
a migratory bird decoy body having an exterior surface;
a migratory bird decoy wing assembly comprising first and second tubular elongate shafts, each shaft extending in a straight line between a first terminal end thereof and an opposite second terminal end thereof;
a first flexible flag having a first edge portion and a second edge portion disposed opposite the first edge portion, wherein the first flexible flag is adapted to be mounted on the first elongate shaft with the first edge portion of the flag proximal the first elongate shaft and with the second edge portion of the flag distal the first elongate shaft and flappingly displaceable relative the first elongate shaft;
a second flexible flag having a first edge portion and a second edge portion disposed opposite the first edge portion, wherein the second flexible flag is adapted to be mounted on the second elongate shaft with the first edge portion of the flag proximal the second elongate shaft and with the second edge portion of the flag distal the second elongate shaft and flappingly displaceable relative the second elongate shaft;
a first elongate shaft mounting device constructed and arranged to removably and nondestructively mount a linear end portion of the first terminal end of the first elongate shaft on the body of the migratory bird decoy so that the linear end portion, as well as the remainder of the first elongate shaft, extends perpendicular to the surface of the migratory bird decoy body and so that in a normal mounted operating state of the migratory bird decoy wing assembly the first flexible flag is spaced apart from the surface of the migratory bird decoy body and a surface which supports the migratory bird decoy, so that flapping movement of the first flexible flag produced by wind simulates the movement of a bird flapping a first wing; and
a second elongate shaft mounting device constructed and arranged to removably and nondestructively mount a linear end portion of the first terminal end of the second elongate shaft on the body of the migratory bird decoy so that the linear end portion, as well as the remainder of the second elongate shaft, extends perpendicular to the surface of the migratory bird decoy body and so that in a normal mounted operating state of the migratory bird decoy wing assembly the second flexible flag is spaced apart from the surface of the migratory bird decoy body and a surface which supports the migratory bird decoy, so that flapping movement of the second flexible flag produced by wind simulates the movement of a bird flapping a second wing, wherein said second elongate shaft mounting device is separate from and selectively positionable relative to said first elongate shaft mounting device.

* * * * *